US009225974B2

(12) United States Patent
Seo et al.

(10) Patent No.: US 9,225,974 B2
(45) Date of Patent: Dec. 29, 2015

(54) MULTI-VIEW DEVICE OF DISPLAY APPARATUS AND CONTROL METHOD THEREOF, AND DISPLAY SYSTEM

(71) Applicant: SAMSUNG ELECTRONICS CO., LTD., Suwon-si (KR)

(72) Inventors: Jae-hwan Seo, Daegu (KR); Jae-eun Kang, Suwon-si (KR); Scott Seong-wook Lee, Suwon-si (KR); Tae-hyeun Ha, Suwon-si (KR); Chil-youl Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 13/661,614

(22) Filed: Oct. 26, 2012

(65) Prior Publication Data

US 2013/0106820 A1    May 2, 2013

Related U.S. Application Data (60) Provisional application No. 61/552,071, filed on Oct. 27, 2011.

(30) Foreign Application Priority Data

Apr. 13, 2012    (KR) .................... 10-2012-0038299

(51) Int. Cl.
*G06F 3/038*    (2013.01)
*H04N 13/04*    (2006.01)
(52) U.S. Cl.
CPC .................................. *H04N 13/0438* (2013.01)
(58) Field of Classification Search
CPC .......... H04N 13/0438; H04N 13/0497; H04N 13/044; H04N 13/0051; H04N 2213/008; G02B 27/2264

USPC ................................ 345/211; 349/13; 348/56
See application file for complete search history.

(56) References Cited

U.S. PATENT DOCUMENTS

| 4,286,286 A | 8/1981 | Jurisson et al. |
| 6,727,867 B2 | 4/2004 | Divelbiss et al. |

(Continued)

FOREIGN PATENT DOCUMENTS

| CN | 1330281 A | 1/2002 |
| CN | 102004322 A | 4/2011 |

(Continued)

OTHER PUBLICATIONS

Communication dated Jan. 7, 2013 issued by the International Searching Authority in counterpart International Application No. PCT/KR2012/007300, 3 pages.

(Continued)

*Primary Examiner* — Dorothy Harris
(74) *Attorney, Agent, or Firm* — Sughrue Mion, PLLC (57) ABSTRACT

A multi-view device for use in conjunction with a display apparatus is provided. The device includes: a lens unit which operates to selectively transmit or block light; a communication unit which communicates with the display apparatus which is displaying a content image; and a controller which receives a beacon signal in synchronization with a display period of the content image from the display apparatus via the communication unit, controls an operation of the lens unit based on the received beacon signal, and changes a reception frequency of the beacon signal in accordance with a running time of the content image displayed on the display apparatus.

22 Claims, 7 Drawing Sheets

(56) References Cited

U.S. PATENT DOCUMENTS

| | | | |
|---|---|---|---|
| 2001/0043266 A1* | 11/2001 | Robinson et al. | 348/53 |
| 2003/0142087 A1* | 7/2003 | Shiotsu et al. | 345/211 |
| 2005/0135390 A1* | 6/2005 | Anderson et al. | 370/401 |
| 2006/0039469 A1* | 2/2006 | Leibbrandt | 375/240.08 |
| 2007/0150592 A1* | 6/2007 | Bell | 709/226 |
| 2007/0232255 A1* | 10/2007 | Masuda | 455/343.1 |
| 2007/0252552 A1* | 11/2007 | Walrath | 320/107 |
| 2009/0116581 A1 | 5/2009 | Liau | |
| 2010/0149320 A1* | 6/2010 | MacNaughton et al. | 348/51 |
| 2010/0165085 A1 | 7/2010 | MacNaughton et al. | |
| 2010/0194857 A1 | 8/2010 | Mentz et al. | |
| 2010/0295929 A1 | 11/2010 | Yoshifuji et al. | |
| 2011/0007140 A1 | 1/2011 | Nakahata et al. | |
| 2011/0050849 A1* | 3/2011 | Lee et al. | 348/43 |
| 2011/0080422 A1* | 4/2011 | Lee et al. | 345/589 |
| 2011/0115890 A1 | 5/2011 | Kim et al. | |
| 2011/0205345 A1* | 8/2011 | Choi et al. | 348/56 |
| 2011/0211051 A1 | 9/2011 | Park et al. | |
| 2011/0216176 A1 | 9/2011 | MacNaughton et al. | |
| 2011/0221874 A1 | 9/2011 | Oh | |
| 2011/0234774 A1* | 9/2011 | Satoh et al. | 348/56 |
| 2011/0242104 A1 | 10/2011 | Zhang et al. | |
| 2011/0242290 A1* | 10/2011 | Arai | 348/51 |
| 2011/0249102 A1 | 10/2011 | MacNaughton et al. | |
| 2011/0285833 A1* | 11/2011 | Tsurumoto et al. | 348/56 |
| 2012/0007967 A1 | 1/2012 | Kondo et al. | |
| 2012/0027375 A1* | 2/2012 | Yasui | 386/230 |
| 2012/0038758 A1 | 2/2012 | Khassanov et al. | |
| 2012/0050856 A1 | 3/2012 | Shintani | |
| 2012/0081528 A1* | 4/2012 | Kikuchi et al. | 348/56 |
| 2013/0106927 A1* | 5/2013 | Seo et al. | 345/691 |
| 2013/0335539 A1* | 12/2013 | Seo et al. | 348/56 |

FOREIGN PATENT DOCUMENTS

| | | |
|---|---|---|
| DE | 290 09 284 A1 | 9/1980 |
| EP | 2325686 A1 | 5/2011 |
| EP | 2 362 669 A2 | 8/2011 |
| JP | 2010268036 A | 11/2010 |
| KR | 101056182 B1 | 8/2011 |
| KR | 1020110087438 A | 8/2011 |
| WO | 2011052125 A1 | 5/2011 |
| WO | 2011/108285 A1 | 9/2011 |

OTHER PUBLICATIONS

Communication dated Jan. 28, 2013 issued by the International Searching Authority in counterpart International Application No. PCT/KR2012/008885, 3 pages.

Communication, dated Sep. 24, 2013, issued by the European Patent Office in counterpart European Application No. 13166006.0, 6 pages.

International Search Report, dated Jul. 31, 2013, issued by the International Searching Authority in counterpart International Application No. PCT/KR2013/002604, 4 pages.

Communication dated Sep. 1, 2014 issued by the European Patent Office in counterpart European Patent Application No. 12187504.1.

Communication dated Sep. 8, 2014 issued by the United States Patent and Trademark Office in counterpart U.S. Appl. No. 13/653,063.

Communication dated May 13, 2014, issued by the European Patent Office in counterpart European Application No. 12187504.1.

Communication dated May 23, 2014, issued by the European Patent Office in counterpart European Application No. 12186445.8.

Communication dated Jul. 9, 2014, issued by the European Patent Office in counterpart European Application No. 13166006.0.

Bluetooth (TM) Doc, "Bluetooth 3D Synchronization Profile", Bluetooth Profile Specification, May 15, 2014, pp. 1-67.

Office Action dated Jan. 9, 2015 issued by United States Patent and Trademark Office in U.S. Appl. No. 13/653,063.

Communication dated Oct. 10, 2015 issued by the State Intellectual Property Office of the People's Republic of China in counterpart Chinese Patent Application No. 201210417503.X.

Communication dated Oct. 23, 2015 issued by the State Intellectual Property Office of the People's Republic of China in counterpart Chinese Patent Application No. 201210420909.3.

* cited by examiner

FIG. 7 a display apparatus including: a lens unit which operates to selectively transmit or block light; a communication unit which communicates with the display apparatus which is displaying a content image; and a controller which receives a beacon signal in synchronization with a display period of the content image from the display apparatus via the communication unit, controls an operation of the lens unit based on the received beacon signal, and changes a reception frequency of the beacon signal in accordance with a running time of the display of the content image being displayed on the display apparatus.

MULTI-VIEW DEVICE OF DISPLAY APPARATUS AND CONTROL METHOD THEREOF, AND DISPLAY SYSTEM

CROSS-REFERENCE TO RELATED APPLICATIONS

This application claims priority from Korean Patent Application No. 10-2012-0038299, filed on Apr. 13, 2012 in the Korean Intellectual Property Office, and the benefit of U.S. Provisional Patent Application No. 61/552,071, filed on Oct. 27, 2011 in the U.S. Patent and Trademark Office, the disclosures of which are incorporated herein by reference in their entireties.

BACKGROUND

1. Field

Apparatuses and methods consistent with the exemplary embodiments relate to a multi-view device which operates interactively with a display apparatus displaying a content image, a control method thereof, and a display system including the display apparatus and the multi-view device, and more particularly to a multi-view device used in conjunction with a display apparatus which has an improved operation structure corresponding to a period of displaying a content image, a control method thereof, and a display system.

2. Description of the Related Art

A display apparatus processes an image signal which is received from an external image source and displays an image on a display panel, e.g., a liquid crystal display (LCD) panel. The display apparatus scans scan lines including image information onto the panel so as to display an image on the panel, and the scan lines are sequentially arranged on the panel to construct a single image frame.

Although one display apparatus generally displays a single content image at any given time, the display apparatus may display a two-dimensional (2D) image or a three-dimensional (3D) image, or provide a plurality of content images to different users, depending on required conditions.

In an illustrative case of displaying a 3D image, each respective eye of a user has a different viewing angle, and thus the user perceives an object three-dimensionally. According to such a principle, the display apparatus discriminately displays a left-eye image and a right-eye image, and the user perceives the left-eye image and the right-eye image with the left eye and the right eye, respectively, thereby seeing a 3D image. Similarly to the principle of discriminately displaying a left-eye image and a right-eye image, in an illustrative case of providing a plurality of content images, the display apparatus discriminately displays at least two different content images, and a plurality of users selectively perceive the content images, and thus each user may recognize a different content image.

In order that a user may selectively see any one among a left-eye image and a right-eye image of a 3D image and a plurality of content images displayed on a display apparatus, the display apparatus includes a multi-view device which implements such a function. In a display system displaying a 3D image, the multi-view device may include 3D glasses which operate to selectively transmit and/or block light for each respective eye of the user.

SUMMARY

The foregoing and/or other aspects may be achieved by providing a multi-view device for use in conjunction with a display apparatus including: a lens unit which operates to selectively transmit or block light; a communication unit which communicates with the display apparatus which is displaying a content image; and a controller which receives a beacon signal in synchronization with a display period of the content image from the display apparatus via the communication unit, controls an operation of the lens unit based on the received beacon signal, and changes a reception frequency of the beacon signal in accordance with a running time of the display of the content image being displayed on the display apparatus.

The controller may reduce the reception frequency of the beacon signal to be lower than a default value when the running time of the display of the content image exceeds a predetermined threshold time.

The controller may control an activation and an inactivation of the communication unit to receive the beacon signal at a second period which is preset to be longer than a preset first period at which the beacon signal is transmitted from the display apparatus.

The controller may control the operation of the lens unit based on synchronization information relating to the beacon signal received at a first time for the second period from the first time while not receiving the beacon signal by inactivating the communication unit.

The controller may set the second period to be longer than a default value when the running time of the display of the content image exceeds a predetermined threshold time.

The second period may be set to a value which is equal to an integral multiple of the first period.

The controller may extract information relating to the running time of the display of the content image from the beacon signal.

The running time of the display of the content image may be determined as being equal to a remaining running time of the display of the content image which is calculated by using a transmission time of the beacon signal.

The multi-view device may further include a battery which is operable to supply power to the communication unit and to the lens unit and to the controller, wherein the controller may calculate a time from which the lens unit can operate to an end of the running time of the display of the content image when the battery does not supply power to the communication unit but supplies power to the lens unit, and does not receive the beacon signal but operates the lens unit from the calculated time if it is determined that the battery cannot supply the power for the remaining running time.

The multi-view device may further include a battery which is operable to supply power to the communication unit and to the lens unit and to the controller, wherein the controller may reduce the reception frequency of the beacon signal to be lower than a default value if it is determined based on a remaining amount of energy stored in the battery that the battery cannot supply the power for the running time of the display of the content image.

The multi-view device may further include a battery which is operable to supply power to the communication unit and to the lens unit and to the controller, wherein the controller may control to display an error message reporting a determination result if it is determined based on a remaining amount of energy stored in the battery that the battery cannot supply the power for the running time of the display of the content image.

The controller may transmit information corresponding to the error message to the display apparatus such that the error message is displayed on the display apparatus.

The controller may control the lens unit to display the error message such that the error message is recognizable by a user wearing the multi-view device.

The controller may control to display the error message during a break time when the content image is not played within the running time of the display of the content image.

The communication unit may receive the beacon signal via radio frequency (RF) wireless communication.

The multi-view device may create a pairing between the display apparatus and the multi-view device such that the multi-view device receives the beacon signal from the display apparatus, wherein the multi-view device creates the pairing by transmitting a request signal relating to the pairing to the display apparatus and receiving a response signal in response to the request signal from the display apparatus.

The multi-view device may create a pairing between the display apparatus and the multi-view device such that the multi-view device receives the beacon signal from the display apparatus, wherein the multi-view device creates the pairing by transmitting a request signal to a communication terminal installed separately from the display apparatus and receiving a response signal in response to the request signal from the communication terminal, wherein the communication terminal may be configured to transmit the response signal based on pre-stored information relating to one or more operational characteristics of the display apparatus.

Another aspect may be achieved by providing a control method of a multi-view device used in conjunction with a display apparatus, the method including: receiving information relating to a running time of a display of a content image being displayed on the display apparatus; changing a reception frequency for receiving a beacon signal in synchronization with a display period of the content image from the display apparatus in accordance with the received information relating to the running time of the display of the content image; and receiving the beacon signal at the changed reception frequency and operating a lens unit of the multi-view device based on the received beacon signal.

The changing the reception frequency may include reducing the reception frequency of the beacon signal to be lower than a default value when the running time of the display of the content image exceeds a predetermined threshold.

The operating the lens unit of the multi-view device based on the received beacon signal may include selectively activating or inactivating a communication unit of the multi-view device to receive the beacon signal at a second period which is preset to be longer than a preset first period at which the beacon signal is transmitted from the display apparatus.

The selectively activating or inactivating the communication unit of the multi-view device may include operating the lens unit based on synchronization information relating to the beacon signal received at a first time for the second period from the first time while not receiving the beacon signal by inactivating the communication unit.

The changing the reception frequency may include setting the second period to be longer than a default value when the running time of the display of the content image exceeds a predetermined threshold.

The second period may be set to a value which is equal to an integral multiple of the first period.

The receiving the information relating to the running time of the display of the content image may include extracting the information relating to the running time of the display of the content image from the beacon signal.

The running time of the display of the content image may be determined as being equal to a remaining running time of the display of the content image which is calculated by using a transmission time of the beacon signal.

The changing the reception frequency may include: determining whether a battery used in conjunction with the multi-view device can supply power for operating the multi-view device for the remaining running time; calculating a time from which the lens unit can operate to an end of the running time of the display of the content image when the battery does not supply power to the communication unit but supplies power to the lens unit if it is determined that the battery cannot supply the power for the remaining running time; and operating the lens unit from the calculated time while refraining from receiving the beacon signal.

The changing the reception frequency may include: determining whether a battery used in conjunction with the multi-view device can supply power for operating the multi-view device for the running time of the display of the content image based on a remaining amount of energy stored in the battery; and reducing the reception frequency of the beacon signal to be lower than a default value if it is determined that the battery cannot supply the power for the running time of the display of the content image.

The changing the reception frequency may include: determining whether a battery used in conjunction with the multi-view device can supply power for operating the multi-view device for the running time of the display of the content image based on a remaining amount of energy stored in the battery; and displaying an error message reporting a determination result if it is determined that the battery cannot supply the power for the running time of the display of the content image.

The displaying the error message may include transmitting information corresponding to the error message to the display apparatus such that the error message is displayed on the display apparatus.

The displaying the error message may include causing the lens unit to display the error message such that the error message is recognizable by a user wearing the multi-view device.

The displaying the error message may include displaying the error message during a break time when the content image is not played within the running time of the display of the content image.

Another aspect may be achieved by providing a display system including: a display apparatus which displays a content image; and a multi-view device which operates in synchronization with the content image displayed on the display apparatus, wherein the multi-view device includes: a lens unit which operates to selectively transmit or block light; a communication unit which communicates with the display apparatus; and a controller which receives a beacon signal in synchronization with a display period of the content image from the display apparatus via the communication unit, controls an operation of the lens unit based on the received beacon signal, and changes a reception frequency of the beacon signal in accordance with a running time of the display of the content image being displayed on the display apparatus.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary skill in the art. The exemplary embodiments may be embodied in various forms without being limited to the exemplary embodiments set forth herein. Descriptions of well-known parts are omitted for clarity and conciseness, and like reference numerals refer to like elements throughout.

Figure 1:
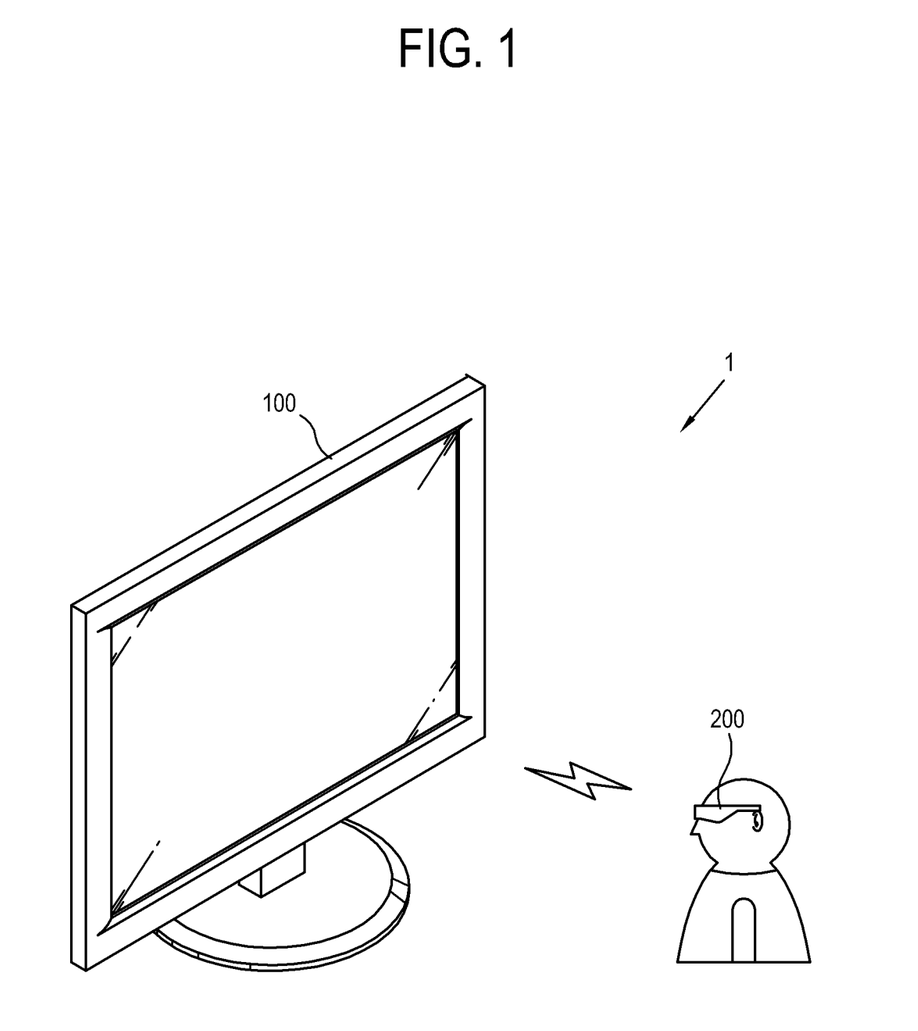
FIG. 1 shows an illustrative example of a display system according to a first exemplary embodiment.

FIG. 1 shows an illustrative example of a display system 1 according to a first exemplary embodiment.

As shown in FIG. 1, the display system 1 according to the present exemplary embodiment includes a display apparatus 100 which processes an image signal input from the outside to display an image and a multi-view device 200 which operates in correspondence with an image displayed on the display apparatus 100.

In the present exemplary embodiment, the multi-view device 200 is 3D glasses 200 which operate to selectively transmit or block light corresponding to a three-dimensional (3D) image when the display apparatus 100 displays the 3D image. However, the multi-view device 200 may be employed when the display apparatus 100 displays not only a 3D image but also at least two different content images.

The display apparatus 100 receives an image signal from an external image source (not shown). The image source is not particularly limited, and the display apparatus 100 may be provided with an image signal from any one of various image sources, such as, for example, a main computer (not shown) which generates an image signal by using a central processing unit (CPU) (not shown) and a graphic card (not shown) and provides the signal locally, a server (not shown) providing an image signal to a network, and a transmitter (not shown) of a broadcasting station transmitting a broadcast signal using a ground wave or cable.

The display apparatus 100 receives a two-dimensional (2D) image signal corresponding to a 2D image or a 3D image signal corresponding to a 3D image from the outside, and processes the image signals to display images. In particular, unlike a 2D image, a 3D image includes a left-eye image frame corresponding to a left eye of a user and a right-eye image frame corresponding to a right eye of the user. When receiving a 3D image signal, the display apparatus 100 alternately displays a left-eye image frame and a right-eye image frame accordingly.

The 3D glasses 200 are provided as shutter glasses. When a 3D image is displayed on the display apparatus 100, the shutter glasses 200 selectively open or block view for the right eye or the left eye of the user in correspondence with a currently displayed image frame from among the left-eye image frame and the right-eye image frame. In particular, if the left-eye image frame is displayed on the display apparatus 100, the shutter glasses 200 open left-eye view of the user and block right-eye view. Conversely, if the right-eye image frame is displayed on the display apparatus 100, the shutter glasses 200 open the right-eye view and block the view of the left eye.

In order to match a 3D image displayed on the display apparatus 100 with a selective light transmitting/blocking operation of the shutter glasses 200, the display apparatus 100 generates a synchronization signal or beacon signal to synchronize with display timing of an image frame, and transmits the signal to the shutter glasses 200. The shutter glasses 200 perform a light transmitting/blocking operation based on the received beacon signal.

In the display system 1 described above, the display apparatus 100 is provided as a home television (TV). In particular, the display apparatus 100 includes a display panel (not shown) which displays an image, and transmits a beacon signal corresponding to the displayed image to the shutter glasses 200.

However, the present inventive concept may be applied to any different type of display system, without being limited to the display system 1 shown in FIG. 1.

Figure 2:
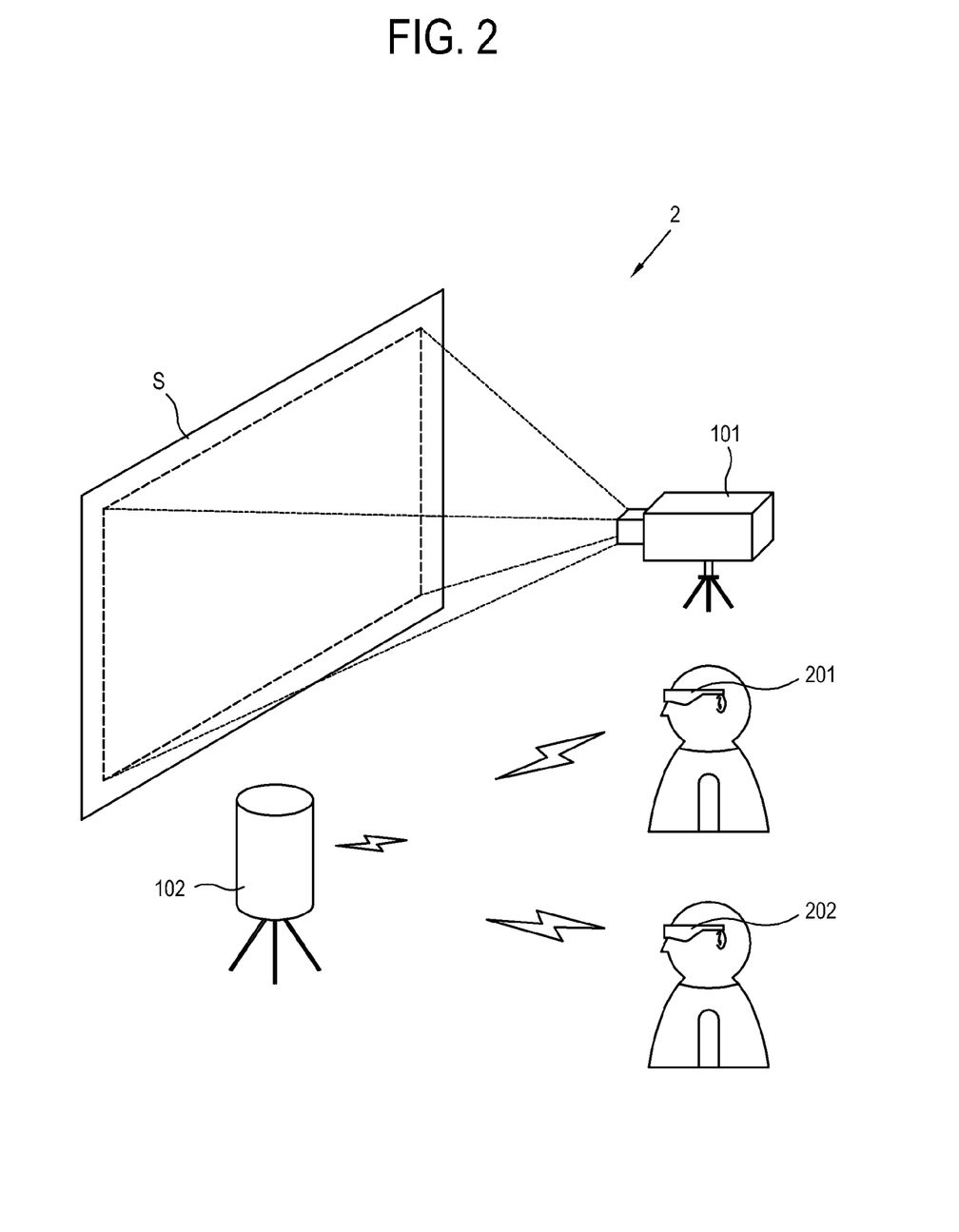
FIG. 2 shows an illustrative example of a display system according to a second exemplary embodiment.

FIG. 2 shows an illustrative example of a display system 2 according to a second exemplary embodiment.

As shown in FIG. 2, the display system 2 according to the present exemplary embodiment is a cinema system for a movie theater. The display system 2 includes a display apparatus 101 which projects a large-screen image onto a screen S, a beacon signal transmission device 102 which emits a beacon signal corresponding to the image projected by the display apparatus 101, and 3D glasses 201 and 202, each of which operates in accordance with the beacon signal emitted from the beacon signal transmission device 102.

The display apparatus 101 may autonomously include a panel (not shown) as in the first exemplary embodiment, or be configured as a projection type for large-screen display and project an image onto the screen S. The projection-type display apparatus 101 is generally known in the field of imaging technology, and thus description thereof is omitted herein.

The beacon signal transmission device 102 emits a beacon signal to the outside, the beacon signal synchronizing with a period of display of a 3D image by the display apparatus 101. The beacon signal transmission device 102 may emit the beacon signal in all directions or a particular direction. Considering the area of a place where the display system 2 is used and a range of a single beacon signal transmission device 102 emitting a beacon signal, a plurality of beacon signal transmission devices 102 may be installed in the place.

The beacon signal transmission device 102 may be provided to communicate with the display apparatus 101 via a cable or wirelessly so that the beacon signal corresponds to an image display period in real time.

The 3D glasses 201 and 202 are provided as shutter glasses 201 and 202, similarly as in the first exemplary embodiment. If a plurality of beacon signal transmission devices 102 are installed in the place for use, the 3D glasses 201 and 202 are disposed most adjacent to the devices 102 to receive a beacon signal from a beacon signal transmission device 102 which emits the clearest beacon signal.

Figure 3:
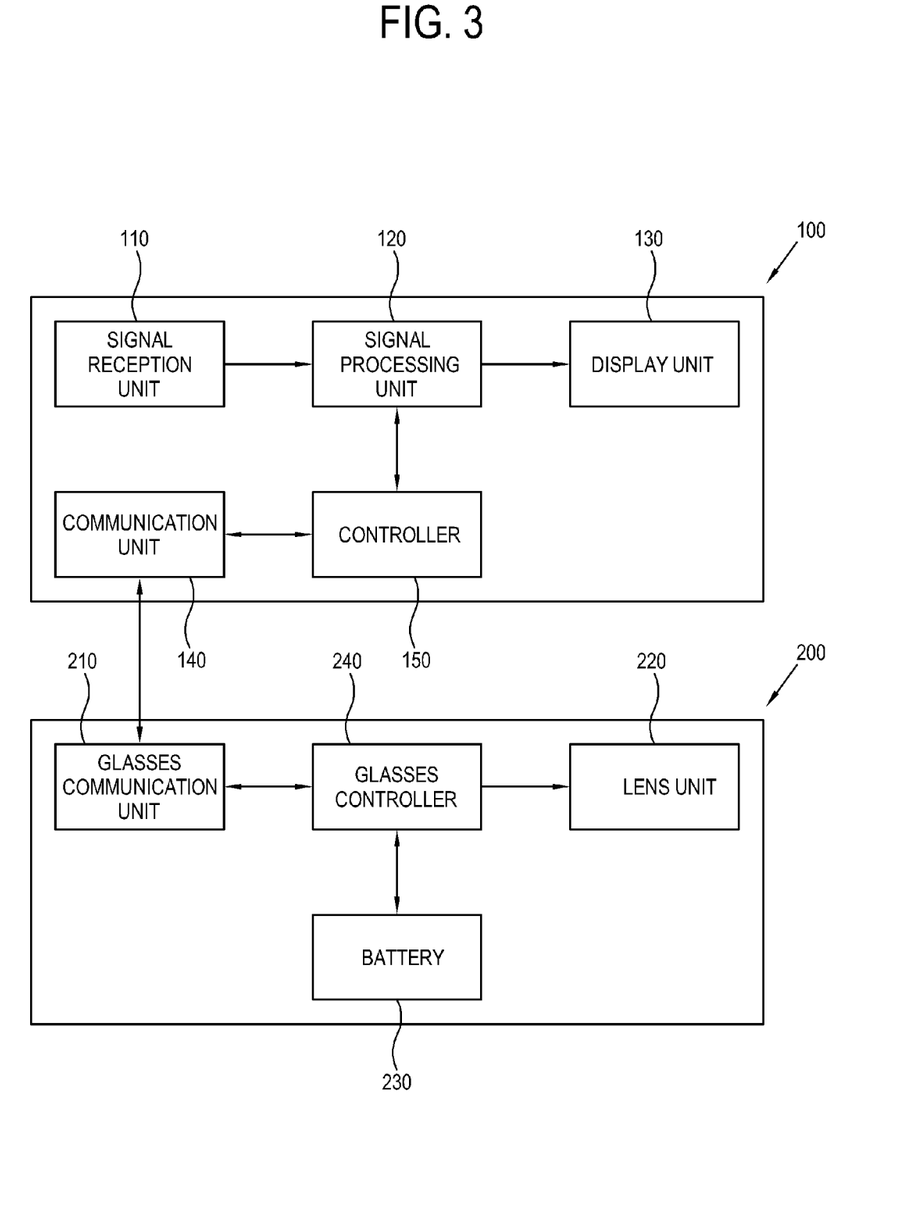
FIG. 3 is a block diagram illustrating configurations of a display apparatus and shutter glasses in the display system of FIG. 1.

Hereinafter, configurations of the display apparatus 100 and the shutter glasses 200 according to the first exemplary embodiment will be described in detail with reference to FIG.

3. FIG. 3 is a block diagram illustrating the configurations of the display apparatus 100 and the shutter glasses 200 in the display system of FIG. 1.

As shown in FIG. 3, the display apparatus 100 includes a signal reception unit 110 which receives an image signal, a signal processing unit 120 which processes the image signal received by the signal reception unit 110 by using a preset image processing process, a display unit 130 which displays the image signal processed by the signal processing unit 120 as an image, a communication unit 140 which communicates with the shutter glasses 200, and a controller 150 which controls all components of the display apparatus 100, and which controls a beacon signal corresponding to a 3D image displayed on the display unit 130 to be transmitted to the shutter glasses 200.

The shutter glasses 200 includes a glasses communication unit 210 which communicates with the display apparatus 100 and receives a beacon signal from the display apparatus 100, a lens unit 220 which operates to transmit/block light for a left eye and a right eye of the user, a battery 230 which supplies power for operation of the shutter glasses 200, and a glasses controller 240 which operates the lens unit 220 based on the beacon signal.

Hereinafter, each component of the display apparatus 100 will be described.

The signal reception unit 110 receives and transmits an image signal and/or image data to the signal processing unit 120. The signal reception unit 110 may be configured as any of various forms corresponding to standards of received image signals and types of the display apparatus 100. For example, the signal reception unit 110 may receive a radio frequency (RF) signal transmitted from a broadcasting station (not shown) wirelessly, or any of various image signals according to one or more of composite video, component video, super video, SCART, high definition multimedia interface (HDMI), DisplayPort, unified display interface (UDI) or wireless HD standards via a cable. When an image signal is a broadcast signal, the signal reception unit 110 includes a tuner to receive the broadcast signal by each channel. Alternatively, the signal reception unit 110 may receive an image data packet from a server (not shown) via a network.

The signal processing unit 120 performs various image processing processes on an image signal received by the signal reception unit 110. The signal processing unit 120 outputs a processed image signal to the display unit 130, so that an image based on the processed image signal is displayed on the display unit 130.

The signal processing unit 120 may perform any type of image processing, without being limited to, for example, decoding corresponding to an image format of an image signal, de-interlacing to convert an interlaced image signal into a progressive form, scaling to adjust an image signal to a preset resolution, noise reduction to improve image quality, detail enhancement, and frame refresh rate conversion.

The signal processing unit 120 may be provided as an integrated multi-functional component, such as a system on chip (SOC), or as an image processing board (not shown) formed by mounting separate components which independently conducts individual processes on a printed circuit board (PCB), and which is installed in the display apparatus 100.

The display unit 130 displays an image based on an image signal output from the signal processing unit 120. The display unit 130 may be configured in any one of various display modes using, for example, liquid crystals, plasma, light emitting diodes, organic light emitting diodes, a surface conduction electron emitter, a carbon nano-tube, nano-crystals, or the like, without being limited thereto.

The display unit 130 may further include an additional component depending on its display mode. For example, when the display unit 130 is configured in a display mode using liquid crystals, the display unit 130 includes a liquid display panel (not shown), a backlight unit (not shown) providing light to the display panel, and a panel driving board (not shown) driving the panel.

The communication unit 140 transmits a beacon signal transmitted from the controller 150 to the shutter glasses 200. The communication unit 140 is provided in accordance with bidirectional RF wireless communication standards, such as RF and Bluetooth, and performs transmission and reception of various unlimited signals/information/data, including a beacon signal, between the display apparatus 100 and the shutter glasses 200.

The controller 150 generates a beacon signal which is synchronized with display timing or display period of a 3D image displayed on the display unit 130 and transmits the beacon signal to the communication unit 140 to be transmitted to the shutter glasses 200.

Hereinafter, each component of the shutter glasses 200 will be described.

The glasses communication unit 210 is configured based on a communication standard of the communication unit 140, and transmits a beacon signal which is received wirelessly from the communication unit 140 to the glasses controller 140. The glasses communication unit 210 may perform bidirectional communication with the communication unit 140 by not only receiving data from the communication unit 140 but also transmitting data to the communication unit 140.

The lens unit 220 operates to selectively transmit/block light for both eyes of the user based on controls implemented by the glasses controller 240. The lens unit 220 performs selective light transmission for each of the left eye and the right eye of the user, and accordingly the user perceives a left-eye image and a right-eye image displayed on the display unit 130 with the left eye and the right eye, respectively.

The lens unit 220 may be configured as any type, such as, for example, a liquid crystal lens unit which operates to block light when a predetermined level of voltage is applied from the glasses controller 240 and to transmit light when the predetermined level of voltage is not applied. Alternatively, the lens unit 220 may have a variable light transmittance, depending on an applied voltage level.

The battery 230 supplies power for operating each component of the shutter glasses 200. The battery 230 is provided as a primary battery or secondary battery, preferably a secondary battery which is chargeable with external power for utility. The battery 230 is controlled by the glasses controller 240, thereby controlling whether to output power to a particular component or level of output voltage.

The glasses controller 240 selectively applies voltage to the lens unit 220 based on a beacon signal received by the glasses communication unit 210, thereby driving the lens unit 220. The glasses controller 240 operates the lens unit 220 to transmit light for the left eye of the user and to block light for the right eye of the user in a vertical synchronization period when a left-eye image is displayed. Conversely, the glasses controller 240 operates the lens unit 220 to block light for the left eye of the user and to transmit light for the right eye of the user in a vertical synchronization period when a right-eye image is displayed. Further, the glasses controller 240 operates the lens unit 220 to block light for both eyes of the user while an image is scanned onto the display unit 130. The foregoing operations are provided for illustrative purposes to show that the glasses controller 240 drives the lens unit 220, but do not limit the scope of the present exemplary embodiment.

Figure 4:
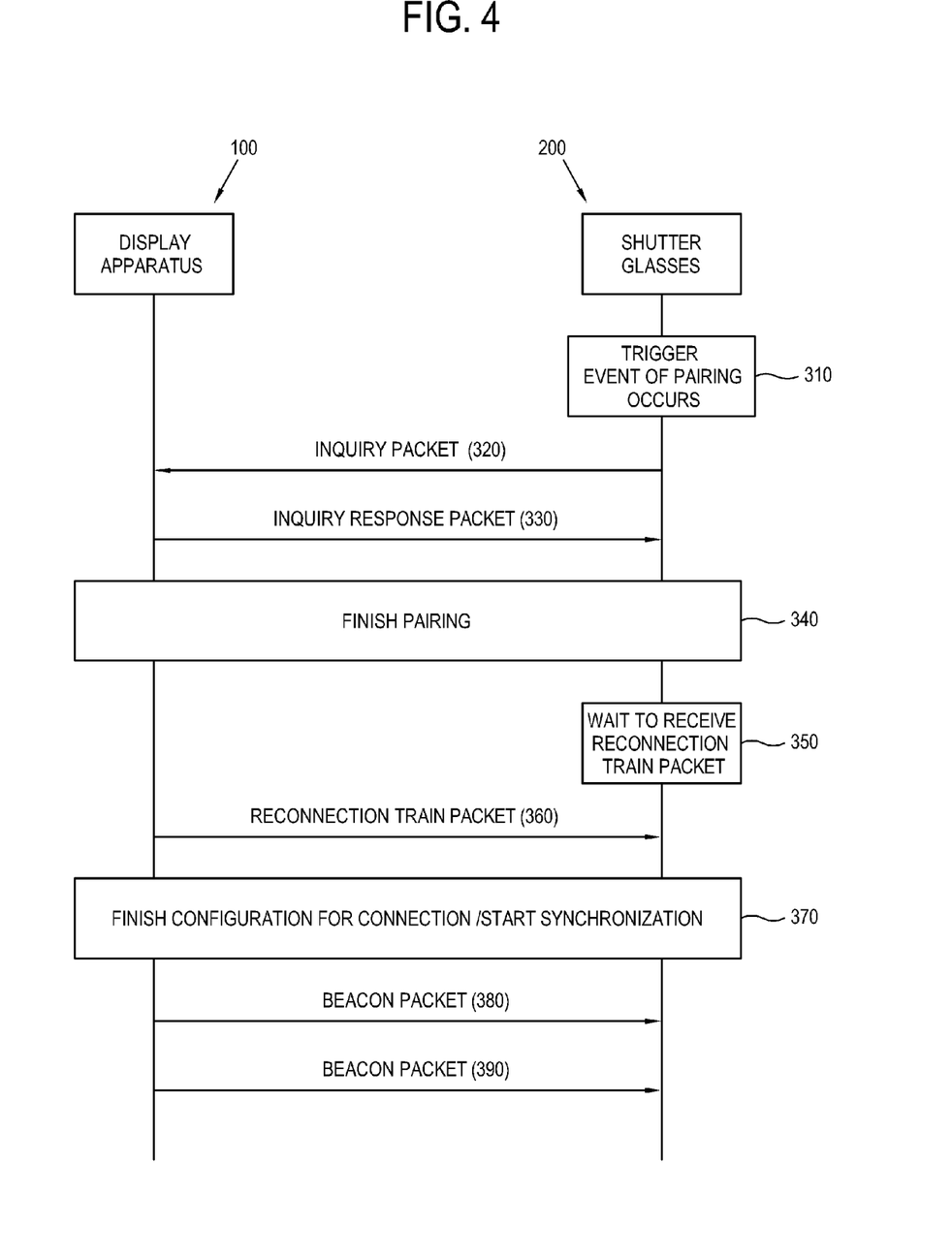
FIG. 4 is a schematic view transmission and reception of a signal between the display apparatus and the shutter glasses of FIG. 3.

Hereinafter, a signal transmission/reception process which is implemented between the display apparatus 100 and the shutter glasses 200 to operate the shutter glasses 200 in synchronization with a display period of a 3D image displayed on the display apparatus 100 will be described with reference to FIG. 4. FIG. 4 is a schematic view illustrating transmission and reception of a signal between the display apparatus 100 and the shutter glasses 200.

First, as shown in FIG. 4, a pairing or an association of the display apparatus 100 with the shutter glasses 200 is necessary so that the shutter glasses 200 receive a beacon signal from the display apparatus 100 and operate in correspondence with the beacon signal.

To create a pairing, in operation 310, a user causes a trigger event to initiate the pairing by using the shutter glasses 200. The trigger event may occur as a result of any one of various actions, such as, for example, the user retrieving, with the shutter glasses 200, a display apparatus 100 which is present within a communication range of the shutter glasses 200.

In operation 320, the shutter glasses 200 transmit an inquiry packet which includes a request for a pairing to the display apparatus 100.

In operation 330, the display apparatus 100 transmits an inquiry response packet to the shutter glasses 200 in response to receipt of the inquiry packet from the shutter glasses 200. The inquiry response packet may include, for example, information relating to a manufacturer of the display apparatus 100, information relating to an output level of the display apparatus 100 for transmission of a packet, or other relevant information.

In operation 340, the shutter glasses 200 receive the inquiry response packet from the display apparatus 100, thereby finishing the pairing of the display apparatus 100 with the shutter glasses 200. In this stage, the shutter glasses 200 transmit, to the display apparatus 100, an association notification packet which confirms reception of the inquiry response packet, and the display apparatus 100 transmits, to the shutter glasses 200, a packet which confirms reception of the association notification packet, thereby completing the process of creating the pairing.

In particular, the association notification packet transmitted from the shutter glasses 200 to the display apparatus may include, for example, an address of the shutter glasses 200, a device type of the shutter glasses 200, information relating to characteristics and remaining amount of a battery, and/or other relevant information. In this manner, individual characteristic information may be exchanged between the display apparatus 100 and the shutter glasses 200, thereby implementing the pairing or association of the components.

When the pairing has been created, in operation 350, the shutter glasses 200 wait to receive a reconnection train packet within a preset time from when the creation of the pairing is finished. If the reconnection train packet is not received within the preset time, the shutter glasses 200 may transmit a packet which includes a request for transmission of the reconnection train packet to the display apparatus 100.

In operation 360, the display apparatus 100 transmits the reconnection train packet to the shutter glasses 200. The reconnection train packet includes information which is necessary for the shutter glasses 200 to receive a beacon packet. The reconnection train packet may include, for example, a communication clock of the display apparatus 100, an address of the display apparatus 100, information relating to a period of the beacon packet, and/or other relevant information.

In operation 370, the shutter glasses 200 finish implementation of a configuration for connection to the display apparatus 100 based on the received reconnection train packet and perform synchronization with an image displayed on the display apparatus 100.

After the reconnection train packet has been received, the shutter glasses 200 ignore a subsequently received reconnection train packet. Because the display apparatus 100 periodically transmits the reconnection train packet for a predetermined time after the completion of the creation of the pairing, the shutter glasses 200 may receive the reconnection train packet again to be reconnected to the display apparatus 100 without a request, if desiring to be reconnected to the display apparatus 100.

In operations 380 and 390, the shutter glasses 200 receive a beacon packet periodically transmitted from the display apparatus 100 based on the reconnection train packet. The shutter glasses 200 operate the lens unit 220 in synchronization with a display period of a 3D image of the display apparatus 100 based on the received beacon packets.

The beacon packet may include, for example, one or more of a display timing relating to an image based on the communication clock from the display apparatus 100, a delay value relating to a timing of operating a shutter of the lens unit 220 for both eyes of the user, a running time of a content image displayed on the display apparatus 100, and/or a remaining running time of the content image after a current time.

With this configuration, when a 3D image of content is displayed on the display apparatus 100, the shutter glasses 200 operate in synchronization with the 3D image.

The foregoing exemplary embodiment has been described with reference to the display system 1 of FIG. 1, but may also be applied to the display system 2 of FIG. 2. In this case, the display system 2 may include a separate communication terminal (not shown) for pairing the display apparatus 101 with each of the shutter glasses 201 and 202.

The communication terminal is installed separately from the display apparatus 101 so that users of the shutter glasses 201 and 202 may easily access the communication terminal, and uses previously stored information relating to operational characteristics of the display apparatus 101 to pair the display apparatus 101 with each of the shutter glasses 201 and 202.

For example, transmission/reception of a packet in each of operations 310, 320, 330, and 340 of FIG. 4 may be carried out between the communication terminal and the shutter glasses 201 and 202, instead of between the display apparatus 101 and the shutter glasses 201 and 202, and transmission/reception of a packet in each of operations 360, 370, 380, and 390 may be carried out between the display apparatus 101 and the shutter glasses 201 and 202.

Conducting a pairing operation by using the communication terminal instead of the display apparatus 101 may achieve the following effect.

In a cinematic environment shown in FIG. 2, a plurality of theaters may be provided adjacent to each other. In particular, there may be provided a plurality of display apparatuses 101, each of which displays different respective images, and beacon signal transmission devices 102 may be installed to respectively emit a signal or packet corresponding to the respective display apparatuses 101, and the apparatuses 101 and the devices 102 may be respectively disposed adjacent to each other.

If the pairing operation is carried out via the beacon signal transmission devices 102, the shutter glasses 201 and 202 may possibly be paired with a display apparatus 101 which is displaying an irrelevant image, instead of with a display apparatus 101 which is presenting an image currently watched by the users. Such an occasion may occur, for example, when the users are located in a corner of the theater which is relatively distant from the beacon signal transmission device 102 and a signal currently being transmitted from another beacon signal transmission device 102 disposed beyond a wall is relatively strong.

Thus, if the pairing operation is carried out via the communication terminal, the shutter glasses 201 and 202 selectively receive a reconnection train packet and a beacon packet from a corresponding beacon signal transmission device 102, even though a signal being transmitted from an irrelevant beacon signal transmission device 102 is relatively strong.

Figure 5:
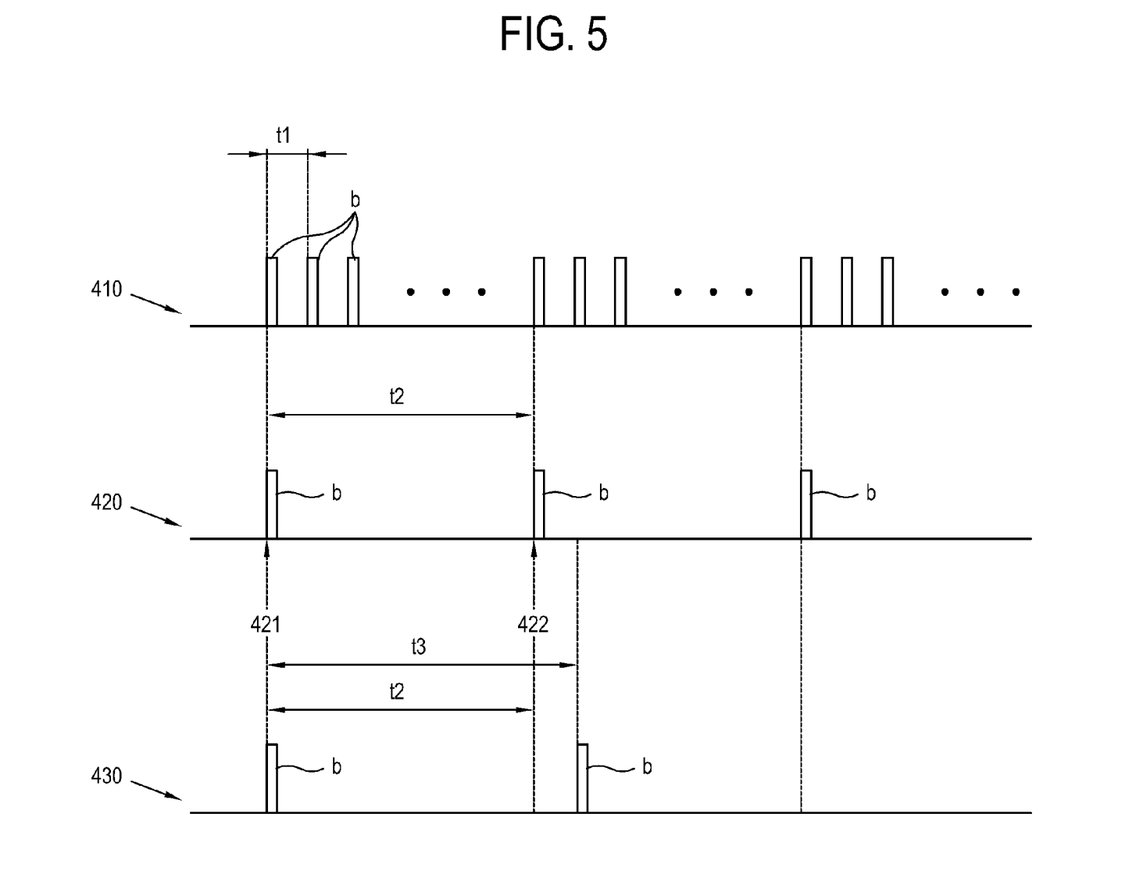
FIG. 5 is a timing diagram illustrating beacon packets transmitted by the display apparatus of FIG. 3 and received by the shutter glasses.

FIG. 5 illustrates an exemplary timing of the shutter glasses 200 receiving a beacon packet b which is transmitted by the display apparatus 100.

As shown in FIG. 5, an upper graph 410 is a timing diagram illustrating a transmission of the beacon packet b by the display apparatus 100, and a lower graph 420 is a timing diagram illustrating a reception of the beacon packet b by the shutter glasses 200. In both graphs 410 and 420, a horizontal axis denotes time.

The display apparatus 100 periodically transmits the beacon packet b to the outside once every preset time interval t1.

However, because the shutter glasses 200 generally use a built-in battery 230, the shutter glasses 200 may or may not be able to continuously operate when a user is watching content having a long running time, such as a movie. Accordingly, it is important for the shutter glasses 200 to secure as much operation time as possible by minimally consuming power of the battery 230.

To this end, the shutter glasses 200 receive the beacon packet b from the display apparatus 100 once every time interval t2, which is longer than t1, i.e., the transmission period of the display apparatus 100. The length of the time interval t2 is not particularly limited, provided that t2 is longer than t1. In some exemplary embodiments, the time interval t2 may be set to a default value that is an integral multiple of t1. For example, t1 may be equal to 80 ms, and t2 may be set as being equal to 560 ms, which is seven times the length of t1.

The shutter glasses 200 inactivate the glasses communication unit 210 for an interval t2 from a first time point 421 when the beacon packet b is received to a second time point 422 when the next beacon packet b is received, thus not receiving the beacon packet b but operating the lens unit 220 based on the beacon packet b received at the first point 421. Such an operation is referred to as a free-run operation.

At the second time point 422, the shutter glasses 200 activate the glasses communication unit 210 and receive the beacon packet b. After receiving the beacon packet b, the shutter glasses 200 inactivate the glasses communication unit 210 again and operate the lens unit 220 in the free-run mode.

In particular, the shutter glasses 200 receive the beacon packet b periodically at intervals of t2, which is longer than t1, the transmission period of the display apparatus 100, and inactivate the glasses communication unit 210 for the interval t2 when they do not receive the beacon packet b, thereby saving power consumption of the battery 230.

However, if the battery 230 is fully charged but a content image has a relatively long running time, there is a possibility that the shutter glasses 200 may cease to operate before the display of the content image is finished. In particular, when the content image has a relatively long running time, it may be necessary to further save power consumption of the battery 230.

To this end, the shutter glasses 200 according to the present exemplary embodiment have the following configuration.

The shutter glasses 200 extract information relating to the running time of the content image from the beacon packet b received from the display apparatus 100, and control a reception frequency of the beacon packet b to be changed through the glasses communication unit 210 based on the extracted information relating to the running time of the content image.

The reception frequency of the beacon packet b is changed by the following method.

Because the content image has a relatively longer running time, the shutter glasses 200 decrease the reception frequency of the beacon packet b to be lower than a default value. Because the reception frequency is the number of times of receiving the beacon packet b per unit time, a decrease in the reception frequency entails a longer reception period of the beacon packet b.

For example, in the graph 420 of FIG. 4 which illustrates the reception of the beacon packet b by the shutter glasses 200, in one example, a period of receiving the beacon packet b, t2, is a default value, t1 is preset to 80 ms and t2 is preset to 560 ms. In this case, the default value of t2, 560 ms, may be determined based on a running time of the content.

As illustrated in graph 430, if the running time of the content extracted from the beacon packet b is determined to be longer than reference running time, the shutter glasses 200 may adjust the reception period of the beacon packet b to t3, which is relatively longer than the default value, t2. Referring to the above-described example, the shutter glasses 200 may set t3 to 640 ms, which is eight times the length of the interval t1, thereby decreasing the reception frequency of the shutter glasses 200 to be lower than the default value. Accordingly, the number of activation times of the glasses communication unit 210 per unit time is reduced, thereby further saving power consumption of the battery 230.

Conversely, if the running time of the content extracted from the beacon packet b is determined to be shorter than the reference running time, the shutter glasses 200 may maintain the reception frequency of the shutter glasses 200 as being equal to the default value. Alternatively, the shutter glasses 200 may adjust t2 to be relatively short in order to guarantee synchronization quality of the lens unit 220, thereby increasing the reception frequency of the shutter glasses 200 to be higher than the default value. The latter operation may be carried out provided that the remaining amount of the battery 230 guarantees continuous operation of the shutter glasses 200 for the entirety of the running time of the content.

The foregoing process, in which the shutter glasses 200 extract the information relating to the running time of the content image from the beacon packet b and change the reception frequency of the beacon packet b based on the extracted information relating to the running time of the content image, may be carried out at a time when the content image starts to be displayed, or for a predetermined period of time, or periodically performed while the content image is displayed.

In the latter case, the beacon packet b includes a remaining running time of the content image which is calculated from a corresponding transmission time, and the shutter glasses 200 may adjust the reception frequency based on the remaining running time of the content image at a point when the beacon packet b is received. In this case, it is possible to precisely control an amount of remaining battery power of the shutter glasses 200 while displaying the content image.

The foregoing exemplary embodiment has been described with reference to a case where the shutter glasses 200 consider only the running time of the content, but may be modified variously.

In detail, the shutter glasses 200 check the remaining amount of the battery 230 at the time of obtaining the information relating to the running time of the content. If it is determined based on the remaining amount of the battery 230 that the battery 230 can not supply power for operating the shutter glasses 200 for the entirety of the running time of the content, the shutter glasses 200 may decrease the reception frequency of the beacon packet b to be lower than the default value.

In addition, if it is determined that the reception frequency of the beacon packet b is changed corresponding to the obtained running time of the content, or that the battery 230 can not supply power for operating the shutter glasses 200 for the entirety of the running time of the content based on the remaining amount of the battery 230, the shutter glasses 200 may control an error message informing a user of a determination result to be displayed.

The error message may include information indicating that operation of the shutter glasses 200 is not guaranteed while the content image is displayed, information reporting the battery 230 needs charging, or information reporting the shutter glasses 200 needs replacing.

The error message may be displayed on the display apparatus 100 or on the shutter glasses 200. In the former case, the shutter glasses 200 transmit information corresponding to the error message to the display apparatus 100 so that the error message is displayed on the display apparatus 100, and the display apparatus 100 displays an image based on the information received from the shutter glasses 200. In the latter case, the shutter glasses 200 may display the error message on the lens unit 220 so that a user wearing the shutter glasses 200 recognizes the message.

The error message may be displayed at proper time so as not to interrupt a user watching the content image. For example, the shutter glasses 200 may display or present the error message not in the middle of the running time of the content, but instead during a break time being used for displaying an advertisement.

In the foregoing exemplary embodiment, the shutter glasses 200 obtain the information relating to the running time of the content image from the beacon packet b, but the information may be obtained by an alternative method. For example, the information may be included in the inquiry response packet 330 (see FIG. 4) or the reconnection train packet 360 (see FIG. 4), instead of in the beacon packet b, and the shutter glasses 200 may extract the information relating to the running time of the content from a corresponding packet.

Alternatively, the shutter glasses 200 may not extract the information from the beacon packet b, but instead receive a separate information packet which is transmitted from the display apparatus 100.

Figure 6:
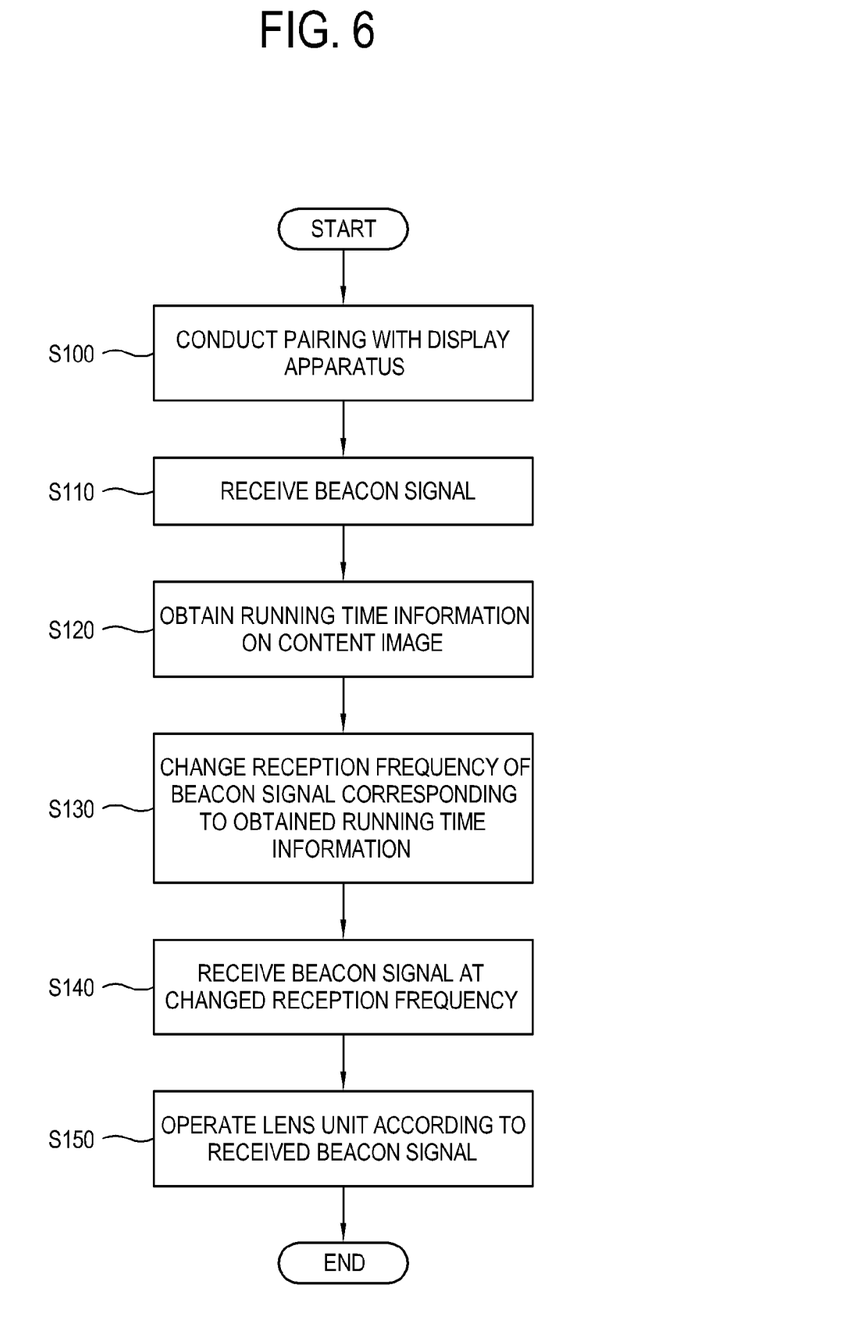
FIG. 6 is a flowchart illustrating a control method of the three-dimensional glasses of FIG. 3.

Hereinafter, a control method which is implemented by using the 3D glasses according to the present exemplary embodiment will be described with reference to FIG. 6. FIG. 6 is a flowchart illustrating the control method which is implemented by using the 3D glasses.

As shown in FIG. 6, in operation S100, the 3D glasses conduct, or create, a pairing with the display apparatus. Then, in operation S110, the 3D glasses receive a beacon signal from the paired display apparatus.

In operation S120, the 3D glasses obtain information relating to a running time of a content image from the beacon signal. Then, in operation S130, the 3D glasses change a reception frequency of the beacon signal based on the obtained information relating to the running time.

In operation S140, the 3D glasses receive the beacon signal at the changed reception frequency, and, in operation S150, the 3D glasses operate the lens unit to selectively transmit/block light for both eyes of a user in accordance with the received beacon signal.

In this manner, the 3D glassed may be controlled.

Figure 7:
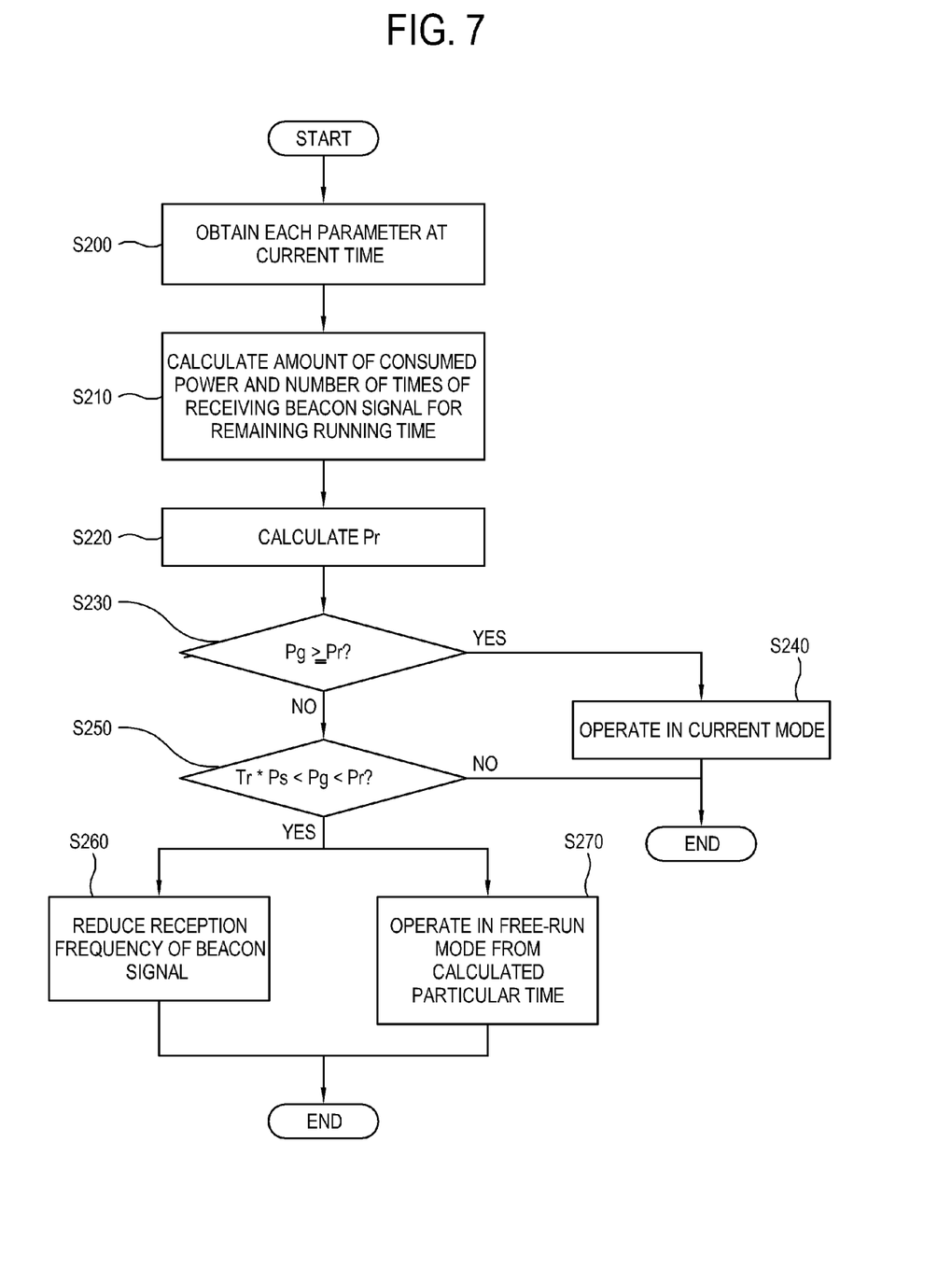
FIG. 7 is a flowchart illustrating a control method of three-dimensional glasses according to a third exemplary embodiment.

In another exemplary embodiment, if it is determined at any point of time when playing the content image that the battery 230 can not supply power for operating the shutter glasses 200 for the remaining running time of the content, the shutter glasses 200 may change the reception frequency of the beacon signal by the glasses communication unit 210. Alternatively, the shutter glasses 200 may calculate a particular time point from which the beacon signal is no longer received, but the lens unit 220 is then operated in the free-run mode. Such a control method will be described with reference to FIG. 7. FIG. 7 is a flowchart illustrating a control method which is implemented by using the shutter glasses 200.

As shown in FIG. 7, in operation S200, the shutter glasses 200 may obtain the following parameters at particular time of an operation:

Tr: Remaining running time of content (unit: seconds (sec));

Tb: Reception period of beacon signal (unit: sec);

Pb: Amount of power consumed when receiving beacon signal (unit: milliampere-hours (mAh));

Ps: Amount of power consumed per unit time when driving lens unit 220 (unit: mAh/sec); and Pg: Remaining amount of power stored in battery 230 from current time (unit: mAh).

The shutter glasses 200 may extract Tr from the beacon signal periodically received from the display apparatus 100. The other parameters relate to the lens unit 220, the glasses communication unit 210 and the battery 230 of the shutter glasses 200. Units of the respective parameters are illustrated for convenience only and thus may be changed depending on a configuration of a device.

In operation S210, the shutter glasses 200 may calculate the following information by using the obtained parameters:

[Tr*Ps]: Amount of power consumed to drive lens unit 220 for remaining running time of content (unit: mAh);

[Tr/Tb]: Number of receptions of the beacon signal for remaining running time of content (unit not specified); and

[{Tr/Tb}*Pb]: Amount of power consumed to receive beacon signal for remaining running time of content (unit: mAh).

By using the above information, in operation S220, the shutter glasses 200 may calculate Pr, which is an amount of power required to receive the beacon signal for the remaining running time from the current time, based on the following equation:

$$Pr = [\{Tr/Tb\}*Pb] + [Tr*Ps] \text{ (unit: mAh)}.$$

The shutter glasses 200 compare Pr with Pg in operation S230. If Pg is greater than Pr, then in operation S240, the shutter glasses 200 do not change an operation mode, but instead maintain a current operation mode. However, if [Tr*Ps]<Pg<Pr, as determined in operation S250, the shutter glasses 200 reduce the reception frequency of the beacon signal by the glasses communication unit 210 to be lower than an original value in operation S260, or the shutter glasses 200 calculate a particular time point from which the beacon signal is no longer received, but instead, in operation S270, the shutter glasses 200 operate the lens unit 220 in the free-run mode.

In particular, a determination of whether [Tr*Ps]<Pg is considered, because operation of the shutter glasses 200 may not be guaranteed even though the beacon signal is not being received, if the remaining amount of the battery 230 is not sufficient even for operating the lens unit 220 only without operating the glasses communication unit 210 for the remaining running time of the content from the current time.

The reception period of the beacon signal, T, may be calculated as follows:

$$N=[Pg-\{Tr*Ps\}]/Pb \text{ (unit not specified); and}$$

$$T=Tr/N \text{ (unit: sec).}$$

N is the number of possible receptions of the beacon signal for the remaining running time of the content. In operation S260, T is increased by a preset multiple, thereby reducing the reception frequency of the beacon signal.

In operation S270, the particular point in time from which the lens unit 220 can operate until finishing playing the content when the battery 230 does not supply power to the glasses communication unit 210 but instead supplies power only to the lens unit 220 is determined. The particular time point may be calculated as follows:

$$A=[[Pg-\{Tr*Ps\}]/Pb]*Tb \text{ (unit: sec).}$$

A is an amount of time, and the particular time point is determined by subtracting A from the termination time of playing the content image. When the content image reaches this particular time point, the shutter glasses 200 do not receive the beacon signal, but instead merely operate the lens unit 220 from the particular time point.

Accordingly, there may be an assurance that a user is able to continuously watch the content currently being viewed to the end, regardless of the remaining amount of the battery 230 of the shutter glasses 200.

Although a few exemplary embodiments have been shown and described, it will be appreciated by those skilled in the art that changes may be made in these exemplary embodiments without departing from the principles and spirit of the present inventive concept, the scope of which is defined in the appended claims and their equivalents.

What is claimed is:

1. A multi-view device for use in conjunction with a display apparatus, comprising:
    a lens unit which operates to selectively transmit or block light;
    a communication unit which communicates with the display apparatus which is displaying a content image;
    a controller which receives a beacon signal in synchronization with a display period of the content image from the display apparatus via the communication unit and controls an operation of the lens unit based on the received beacon signal; and
    a battery which supplies power to the communication unit, the lens unit and the controller,
    wherein the beacon signal comprises a running time of a display of the content image being displayed on the display apparatus,
    the controller determines whether a remaining amount of the battery power is lower than an amount of power required to receive the beacon signal for a remaining running time of the display of the content image, and
    the controller controls the battery to not supply power to the communication unit when it is determined that the remaining amount of the battery power is lower than the amount of power required to receive the beacon signal for the remaining running time of the display of the content image.

2. The multi-view device of claim 1, wherein the controller controls an activation and an inactivation of the communication unit to receive the beacon signal at a second period which is preset to be longer than a preset first period at which the beacon signal is transmitted from the display apparatus.

3. The multi-view device of claim 2, wherein the controller controls the operation of the lens unit based on synchronization information relating to the beacon signal received at a first time for the second period from the first time while not receiving the beacon signal by inactivating the communication unit.

4. The multi-view device of claim 2, wherein the controller sets the second period to be longer than a default value when the running time of the display of the content image exceeds a predetermined threshold time.

5. The multi-view device of claim 2, wherein the second period is set to a value which is equal to an integral multiple of the first period.

6. The multi-view device of claim 1, wherein the controller controls to display an error message reporting a determination result when it is determined based on the remaining amount the battery power that the battery cannot supply the power for the remaining running time of the display of the content image.

7. The multi-view device of claim 6, wherein the controller transmits information corresponding to the error message to the display apparatus such that the error message is displayed on the display apparatus.

8. The multi-view device of claim 6, wherein the controller controls the lens unit to display the error message such that the error message is recognizable by a user wearing the multi-view device.

9. The multi-view device of claim 6, wherein the controller controls to display the error message during a break time when the content image is not played within the running time of the display of the content image.

10. The multi-view device of claim 1, wherein the communication unit receives the beacon signal via radio frequency (RF) wireless communication.

11. The multi-view device of claim 1, wherein the multi-view device creates a pairing between the display apparatus and the multi-view device such that the multi-view device receives the beacon signal from the display apparatus, wherein the multi-view device creates the pairing by transmitting a request signal relating to the pairing to the display apparatus and receiving a response signal in response to the request signal from the display apparatus.

12. The multi-view device of claim 1, wherein the multi-view device creates a pairing between the display apparatus and the multi-view device such that the multi-view device receives the beacon signal from the display apparatus, wherein the multi-view device creates the pairing by transmitting a request signal to a communication terminal installed separately from the display apparatus and receiving a response signal in response to the request signal from the communication terminal, wherein the communication terminal is configured to transmit the response signal based on pre-stored information relating to one or more operational characteristics of the display apparatus.

13. The multi-view device of claim 1, wherein the beacon signal further comprises
    a display timing corresponding to a communication clock of the display apparatus.

14. A control method of a multi-view device used in conjunction with a display apparatus, the method comprising:
    receiving a beacon signal comprising a running time of a display of a content image being displayed on the display apparatus;
    determining whether a remaining amount of power in a battery is lower than an amount of power required to receive the beacon signal for a remaining running time of the display of the content image;

supplying power from the battery to a communication unit, a lens unit and a controller when it is determined that the remaining amount of the battery power is higher than the amount of power required to receive the beacon signal for the remaining running time of the display of the content image; and supplying power to the lens unit and the controller, and not supplying power to the communication unit, when it is determined that the remaining amount of the battery power is lower than the amount of power required to receive the beacon signal for the remaining running time of the display of the content image, wherein the receiving the beacon signal including the running time of the display of the content image comprises extracting the running time of the display of the content image from the beacon signal.

15. The control method of claim 14, wherein the supplying power from the battery to the communication unit comprises selectively activating or inactivating the communication unit of the multi-view device to receive the beacon signal at a second period which is preset to be longer than a preset first period at which the beacon signal is transmitted from the display apparatus.

16. The control method of claim 15, wherein the selectively activating or inactivating the communication unit of the multi-view device comprises operating the lens unit based on synchronization information relating to the beacon signal received at a first time for the second period from the first time while not receiving the beacon signal by inactivating the communication unit.

17. The control method of claim 15, wherein the supplying the power from the battery to the communication unit comprises setting the second period to be longer than a default value when the running time of the display of the content image exceeds a predetermined threshold time.

18. The control method of claim 14, further comprising:
determining whether the battery can supply power for operating the lens unit and the controller for the remaining running time of the display of the content image based on the remaining amount of the battery power; and
displaying an error message reporting a determination result when it is determined that the battery cannot supply power for the remaining running time of the display of the content image.

19. The control method of claim 18, wherein the displaying the error message comprises transmitting information corresponding to the error message to the display apparatus such that the error message is displayed on the display apparatus.

20. The control method of claim 18, wherein the displaying the error message comprises causing the lens unit to display the error message such that the error message is recognizable by a user wearing the multi-view device.

21. The control method of claim 18, wherein the displaying the error message comprises displaying the error message during a break time when the content image is not played within the running time of the display of the content image.

22. A display system comprising:
a display apparatus which displays a content image; and
a multi-view device which operates in synchronization with the content image displayed on the display apparatus,
wherein the multi-view device comprises:
    a lens unit which operates to selectively transmit or block light;
    a communication unit which communicates with the display apparatus;
    a controller which receives a beacon signal in synchronization with a display period of the content image from the display apparatus via the communication unit and controls an operation of the lens unit based on the received beacon signal; and
    a battery which supplies power to the communication unit, the lens unit and the controller,
wherein the beacon signal comprises a running time of the display of the content image being displayed on the display apparatus, and
the controller determines whether a remaining amount of the battery power is lower than an amount of power required to receive the beacon signal for a remaining running time of the display of the content image, and
the controller controls the battery to not supply power to the communication unit when it is determined that the remaining amount of the battery power is lower than the amount of power required to receive the beacon signal for the remaining running time of the display of the content image.

* * * * *